US009508472B2

(12) United States Patent
Deshaies et al.

(10) Patent No.: US 9,508,472 B2
(45) Date of Patent: Nov. 29, 2016

(54) STANDOFF DEVICE AND METHOD OF INSTALLATION OF HARNESS

(75) Inventors: Martin Deshaies, Saint-Lazare (CA); Pierre Landry, Saint-Adèle (CA); Martin Pauzé, St-Hubert (CA); Keith Anthony Wood, Beaconsfield (CA)

(73) Assignee: BOMBARDIER INC., Dorval (CA)

( * ) Notice: Subject to any disclaimer, the term of this patent is extended or adjusted under 35 U.S.C. 154(b) by 227 days.

(21) Appl. No.: 14/003,428

(22) PCT Filed: Mar. 10, 2011

(86) PCT No.: PCT/IB2011/000512
§ 371 (c)(1),
(2), (4) Date: Nov. 6, 2013

(87) PCT Pub. No.: WO2012/120321
PCT Pub. Date: Sep. 13, 2012

(65) Prior Publication Data
US 2014/0060891 A1    Mar. 6, 2014

(51) Int. Cl.
*F16L 3/00*          (2006.01)
*H02G 3/32*          (2006.01)
(Continued)

(52) U.S. Cl.
CPC .............. *H01B 17/16* (2013.01); *H02G 3/30* (2013.01); *F16L 3/221* (2013.01); *F16L 3/237* (2013.01); *H01B 17/14* (2013.01); *H02G 3/32* (2013.01)

(58) Field of Classification Search
CPC ............. F16L 3/00; F16L 3/123; F16L 3/13; F16L 3/221; F16L 3/227; F16L 3/237; F16L 3/323; H02G 3/32; H01B 17/14; H01B 17/16

USPC ............ 248/65, 67.7, 68.1, 73, 74.2, 176.1; 24/16 PB; 174/61 R, 68.1, 158 R
See application file for complete search history.

(56) References Cited

U.S. PATENT DOCUMENTS 4,563,131 A * 1/1986 Bookout ............. F04B 27/0657
417/221
5,169,100 A  12/1992 Milcent et al.
(Continued)

FOREIGN PATENT DOCUMENTS

DE   102008041230 A1 *  2/2010
EP       0459904 A1    12/1991
(Continued)

OTHER PUBLICATIONS

International Search Report, mailed Nov. 22, 2011, for International Patent Application No. PCT/IB2011/000512.
(Continued)

*Primary Examiner* — Tan Le
(74) *Attorney, Agent, or Firm* — Thomas & Karceski, PC

(57) ABSTRACT

A device connects a wire harness to a structure. A fixation portion of the device is secured to the structure. A spacing portion is connected to the fixation portion and to a connector portion. A retaining clip on the connector portion deforms when a wire harness connector component moves axially toward the fixation portion. The clip opposes an abutment edge against the component into engagement position when the component is past the clip to prevent it from moving back onto the clip. An abutment surface contacts another portion of the component in engagement position to prevent further axial movement of the component toward the fixation portion. The component is held captive between the edge and the abutment surface. Also provided are a cable support for connecting the wire harness to the device, a method for connecting and disconnecting the wire harness to a structure with the device, and an aircraft.

14 Claims, 10 Drawing Sheets

(51) Int. Cl.
*H01B 17/16* (2006.01)
*H02G 3/30* (2006.01)
*H01B 17/14* (2006.01)
*F16L 3/237* (2006.01)
*F16L 3/22* (2006.01)

(56) References Cited

U.S. PATENT DOCUMENTS

| | | | |
|---|---|---|---|
| 5,271,588 A * | 12/1993 | Doyle | F16L 3/237 248/68.1 |
| 5,538,208 A | 7/1996 | Cordes et al. | |
| 6,196,751 B1 * | 3/2001 | Khokhar | F16D 1/08 24/16 PB |
| 6,903,275 B1 | 6/2005 | Jetton | |
| 7,297,874 B2 | 11/2007 | Yasuda et al. | |
| 7,484,698 B2 | 2/2009 | Budagher | |
| 7,549,613 B1 | 6/2009 | Ismert et al. | |
| 7,654,492 B2 | 2/2010 | Balderama et al. | |
| 7,740,209 B2 | 6/2010 | Neumann et al. | |
| 7,802,762 B2 * | 9/2010 | Bauer | B60R 16/0215 248/74.2 |
| 8,829,353 B2 * | 9/2014 | Homner | H01B 17/14 174/158 R |
| 8,888,053 B2 * | 11/2014 | Blanchard | B64C 1/406 248/68.1 |
| 2008/0105796 A1 | 5/2008 | Nix et al. | |
| 2009/0236486 A1 | 9/2009 | Matsuno et al. | |
| 2009/0294602 A1 | 12/2009 | Korczak | |
| 2010/0084518 A1 | 4/2010 | Davis et al. | |
| 2010/0294896 A1 * | 11/2010 | Sayilgan | B64C 1/406 248/73 |
| 2015/0214709 A1 * | 7/2015 | Landry | H02G 3/32 248/74.2 |

FOREIGN PATENT DOCUMENTS

| | | |
|---|---|---|
| EP | 0597718 A1 | 11/1993 |
| EP | 0613225 A1 | 8/1994 |

OTHER PUBLICATIONS

Chinese Office Action dated Dec. 1, 2015, for Chinese Patent Application No. 201180070541.6.
Chinese Office Action dated Aug. 3, 2016, for Chinese Patent Application No. 201180070541.6.

* cited by examiner

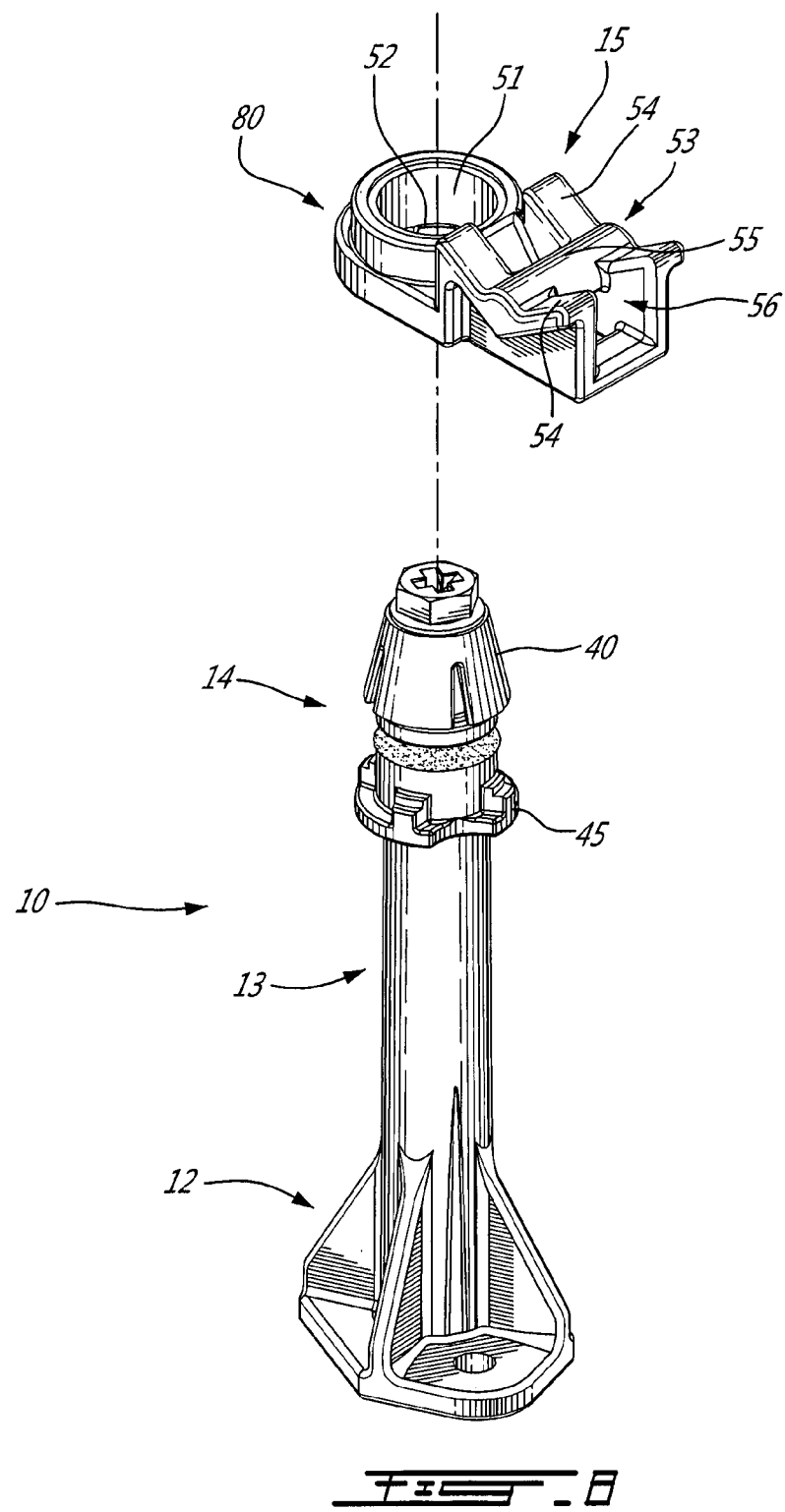

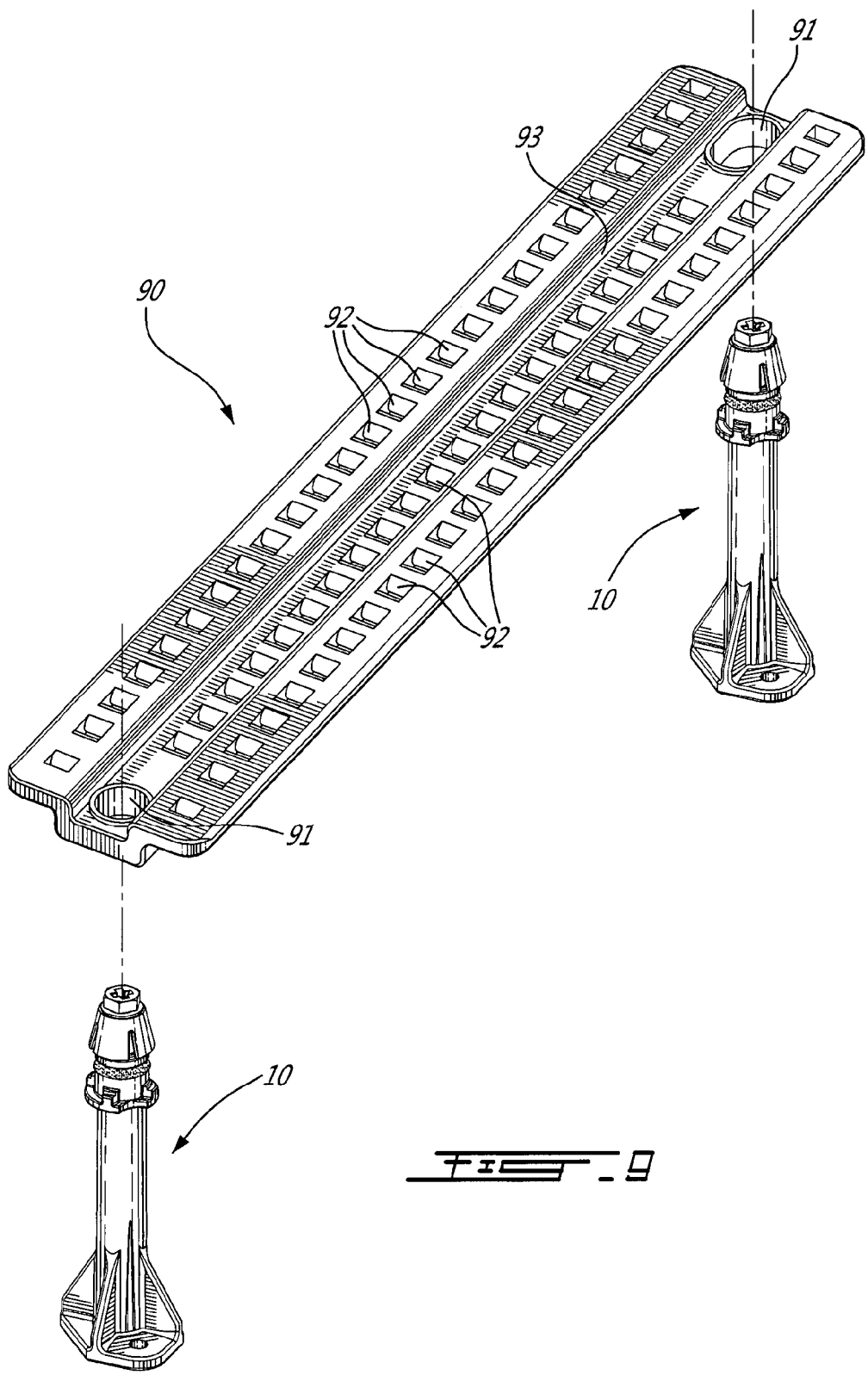

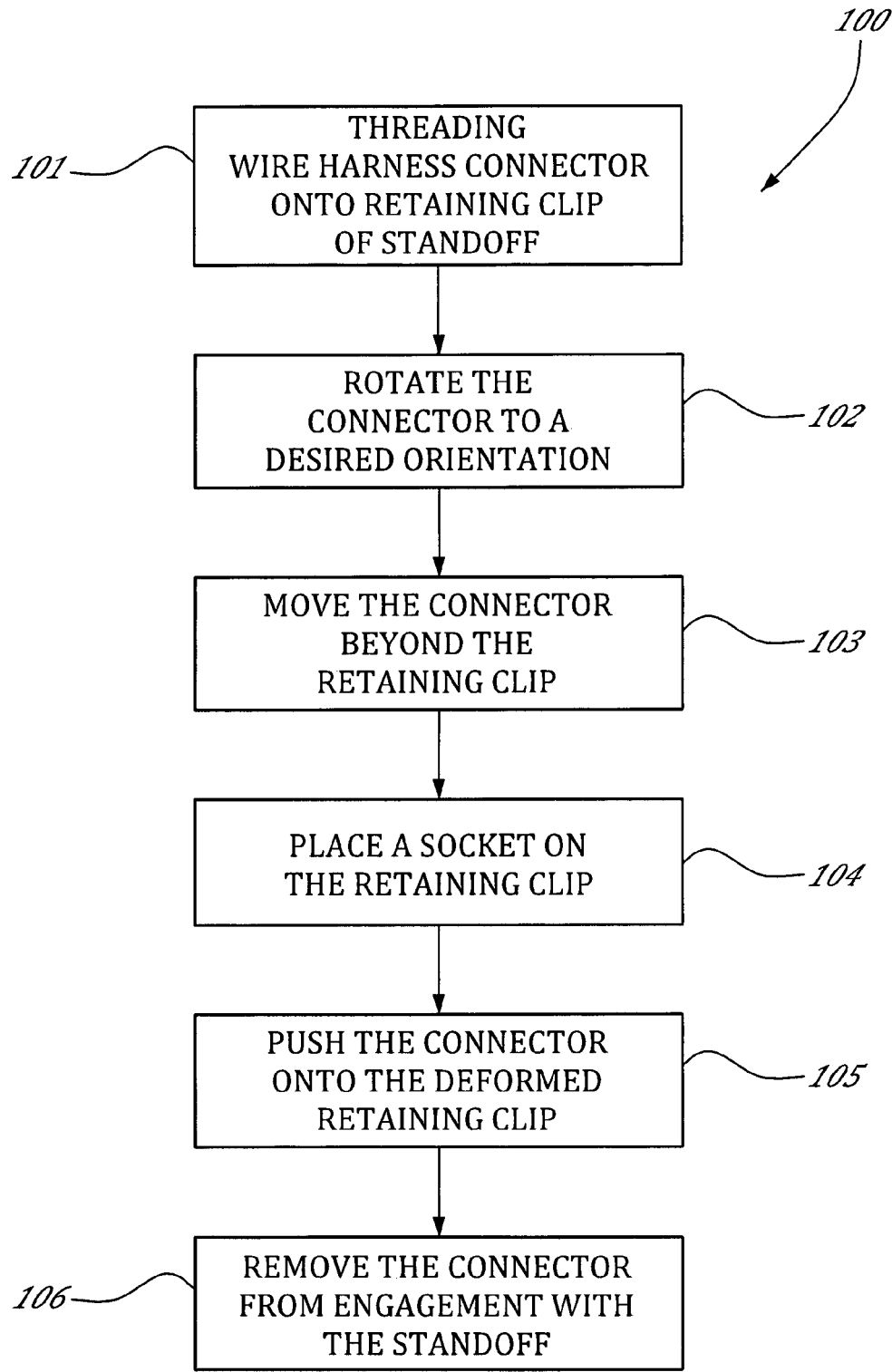

STANDOFF DEVICE AND METHOD OF INSTALLATION OF HARNESS

CROSS-REFERENCE TO RELATED APPLICATION(S)

This is a National Stage Entry into the United States Patent and Trademark Office from International PCT Patent Application No. PCT/IB2011/000512, having an international filing date of Mar. 10, 2011, the entire content of which is incorporated herein by reference.

FIELD OF THE APPLICATION

The present application relates to standoff devices used to connect wire harnesses to structures, for instance in aircraft.

BACKGROUND OF THE ART

Sophisticated vehicles such as aircraft feature wire harnesses relating the multiple wires used for the operation of aircraft systems. However, the installation of such wire harnesses is inefficient in terms of manpower. For instance, standoffs are commonly used to connect wire harnesses to structures, but these standoffs often require bolting/screwing manipulations for the wire harnesses to be fixed to the structure. It would be desirable to reduce the amount of manpower required to secure wire harnesses to structures.

SUMMARY OF THE APPLICATION

It is therefore an aim of the present disclosure to provide a standoff device that addresses at least some issues associated with the prior art.

It is a further aim of the present disclosure to provide a cable support interfacing the wire harness to the standoff device, which cable support may be indexed relative to the standoff device.

It is a still further aim of the present disclosure to provide an aircraft featuring such standoff devices and/or cable supports.

It is a still further aim of the present disclosure to provide a method for connecting and disconnecting a wire harness to a structure of an aircraft.

It is a still further aim of the present disclosure to provide a method for adjusting an orientation of a cable support of a wire harness relative to a standoff device.

Therefore, in accordance with a first embodiment, there is provided a device for connecting a wire harness to a structure, comprising: a fixation portion adapted to be secured to the structure; a spacing portion connected at a first end to the fixation portion; and a connector portion connected to a second end of the spacing portion and spaced apart from the fixation portion, the connector portion comprising a retaining clip adapted to resiliently deform when a wire harness connector component moves axially thereon toward the fixation portion and adapted to oppose at least one abutment edge against a first portion of the connector component into an engagement position when the connector component is past the retaining clip to prevent the connector component from moving back onto the retaining clip, and at least one abutment surface adapted to contact a second portion of the connector component in the engagement position to prevent further axial movement of the connector component toward the fixation portion, whereby the connector component is held captive between the at least one edge and the at least one abutment surface.

Further in accordance with the first embodiment, an elastomeric absorber on the connector portion between the at least one abutment edge and the at least one abutment surface is adapted to contact the wire harness connector component in the engagement position.

Still further in accordance with the first embodiment, indexation formations between the at least one abutment edge and the at least one abutment surface are adapted to be indexingly engaged with complementary indexation formations on the wire harness connector component, whereby the wire harness connector component is blocked in orientation relative to the standoff device.

Still further in accordance with the first embodiment, the indexation formations are indexation blocks each having a stair geometry.

Still further in accordance with the first embodiment, the at least one abutment surface is part of a flange on the connector portion.

Still further in accordance with the first embodiment, at least one cut-out in the flange is in alignment with a respective fastener of the fixation portion.

Still further in accordance with the first embodiment, the fixation portion has a base plate having an undersurface adapted to be laid onto the structure when the device is secured to the structure.

Still further in accordance with the first embodiment, the undersurface of the base plate is substantially flat.

Still further in accordance with the first embodiment, the retaining clip has a skirt geometry, with a flared portion of the retaining clip oriented toward the fixation portion.

Still further in accordance with the first embodiment, the flared portion comprises at least two resilient tabs, with each of the resilient tabs comprising one of the abutment edges.

Still further in accordance with the first embodiment, the spacing portion has an elongated body between the fixation portion and the connector portion.

Still further in accordance with the first embodiment, the elongated body of the spacing portion has one of a longitudinal axis normal to the undersurface of the base plate and a longitudinal axis parallel to the undersurface of the base plate.

Still further in accordance with the first embodiment, the at least one abutment surface lies in at least one abutment plane, the longitudinal axis of the spacing portion being normal to the abutment plane.

In accordance with a second embodiment, there is provided a cable support for connecting a wire harness to a standoff device, comprising: at least one cable interface adapted to support a wire harness portion attached thereto; and a connector portion connected to the at least one cable interface, the connector portion comprising a through bore adapted to be threaded onto a standoff device to resiliently deform a retaining clip to be held captive to the standoff device when passed the retaining clip, and indexation formations adapted to be indexingly engaged with complementary indexation formations on the standoff device, whereby the cable support is blocked in orientation relative to the standoff device.

Further in accordance with the second embodiment, the indexation formations are indexation cavities defined in the connector portion, the indexation cavities each having a stair geometry.

Still further in accordance with the second embodiment, the cable support comprises two of said at least one cable interface.

Still further in accordance with the second embodiment, the through bore has a tapering geometry.

Still further in accordance with the second embodiment, the at least one cable interface comprises a pair of support surfaces separated by a passage and related by a transverse lug, the lug and the passage adapted to receive an attachment for tying the wire harness to the cable interface.

Still further in accordance with the second embodiment, the pair of support surfaces are arranged in a trough configuration.

Still further in accordance with the second embodiment, an opening from a side of the cable interface opposite the support surfaces communicates with the passage.

In accordance with a third embodiment, there is provided a method for connecting and disconnecting a wire harness to a structure with a standoff device, comprising: threading an opening of a wire harness connector component onto a retaining clip of a standoff device to resiliently deform the retaining clip; moving the connector component beyond the retaining clip on the standoff device and into captive engagement with the standoff device by the retaining clip reforming; placing a socket on the retaining clip to resiliently deform the retaining clip; pushing the connector component onto the deformed retaining clip; and removing the connector component from engagement with the standoff device.

Further in accordance with the third embodiment, the connector component is rotated about a longitudinal axis of the standoff device while on the retaining clip until a desired orientation of the connector component is reached relative to the standoff device.

Still further in accordance with the third embodiment, the wires of the wire harness are tied to the wire harness connector prior to threading the opening of the wire harness connector component onto the retaining clip.

In accordance with a fourth embodiment, there is provided a method for connecting a wire harness to a structure with a standoff device, comprising: threading an opening of a wire harness connector component onto a retaining clip of a standoff device to resiliently deform the retaining clip; rotating the connector component about a longitudinal axis of the standoff device while on the retaining clip until a desired orientation of the connector component is reached relative to the standoff device; and moving the connector component beyond the retaining clip on the standoff device and into captive and indexed engagement with the standoff device in the desired orientation by the retaining clip reforming.

Further in accordance with the fourth embodiment, wires of the wire harness are tied to the wire harness connector prior to threading the opening of the wire harness connector component onto the retaining clip.

In accordance with a fifth embodiment, there is provided an aircraft comprising: a structural element; at least one wire harness with at least one wire harness connector component; and a device for connecting the wire harness to the structural element, comprising a fixation portion secured to the structural element, a spacing portion connected at a first end to the fixation portion, and a connector portion connected to a second end of the spacing portion and spaced apart from the fixation portion, the connector portion comprising a retaining clip resiliently deforming when the connector component moves axially thereon toward an engagement position and opposing at least one abutment edge against a first portion of the connector component when the connector component is passed the retaining clip to prevent the connector component from moving back onto the retaining clip, and at least one abutment surface contacting a second portion of the connector component in the engagement position to prevent further axial movement of the connector component toward the spacing portion, whereby the connector component is held captive between the at least one edge and the at least one abutment surface.

Further in accordance with the fifth embodiment, an elastomeric absorber on the connector portion between the at least one abutment edge and the at least one abutment surface contacts the wire harness connector component in the engagement position.

Still further in accordance with the fifth embodiment, indexation formations between the at least one abutment edge and the at least one abutment surface indexingly engage with complementary indexation formations on the wire harness connector component, whereby the wire harness connector component is blocked in orientation relative to the standoff device.

Still further in accordance with the fifth embodiment, the indexation formations on the connector portion are indexation blocks each having a stair geometry.

Still further in accordance with the fifth embodiment, the at least one abutment surface is part of a flange on the connector portion.

Still further in accordance with the fifth embodiment, at least one cut-out in the flange is in alignment with a respective fastener of the fixation portion.

Still further in accordance with the fifth embodiment, the fixation portion has a base plate having an undersurface laid onto the structure when the device is secured to the structure.

Still further in accordance with the fifth embodiment, the undersurface of the base plate is substantially flat.

Still further in accordance with the fifth embodiment, the retaining clip has a skirt geometry, with a flared portion of the retaining clip oriented toward the fixation portion.

Still further in accordance with the fifth embodiment, the flared portion comprises at least two resilient tabs, with each of the resilient tabs comprising one of the abutment edges.

Still further in accordance with the fifth embodiment, the wire harness connector component is any one of a cable support, a hat support, and a tie-down strip.

Still further in accordance with the fifth embodiment, the spacing portion has an elongated body between the fixation portion and the connector portion.

Still further in accordance with the fifth embodiment, the elongated body of the spacing portion has one of a longitudinal axis normal to the undersurface of the base plate and a longitudinal axis parallel to the undersurface of the base plate.

Still further in accordance with the fifth embodiment, the at least one abutment surface lies in at least one abutment plane, the longitudinal axis of the spacing portion being normal to the abutment plane.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF DRAWINGS

For a better understanding of the present invention, as well as other aspects and further features thereof, reference is made to the following description which is to be used in conjunction with the accompanying drawings, where:

FIG. 8 is an assembly view of the standoff device of FIG. 1 with a single cable support, in accordance with another embodiment of the present disclosure;

FIG. 9 is an isometric view of the standoff device of FIG. 1 with a hat support; and FIG. 10 is a flow chart illustrating a connection and disconnection of a wire harness to a structure with a standoff device, such as the standoff device of FIG. 1.

DESCRIPTION OF PREFERRED EMBODIMENTS

Figure 1:
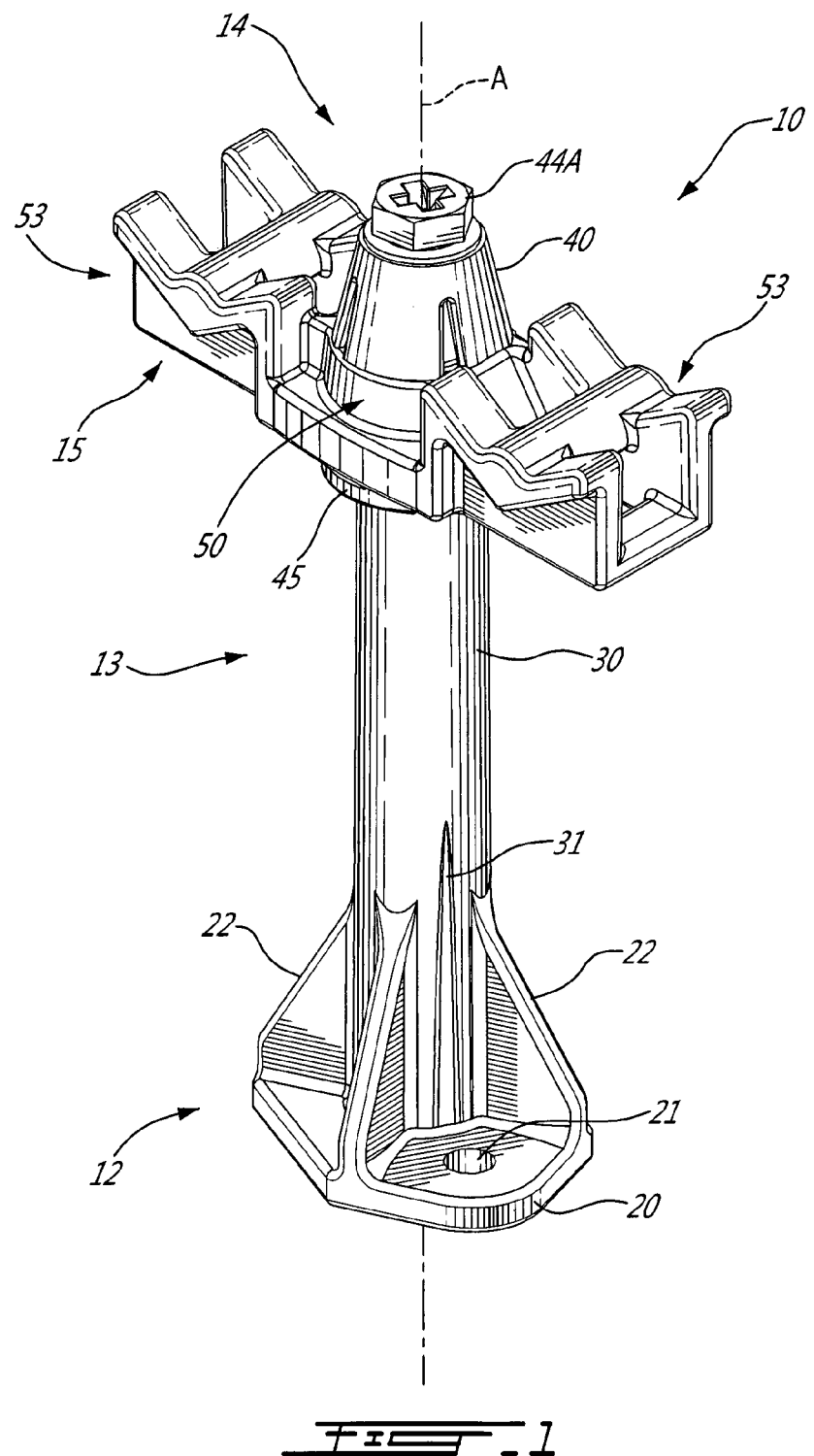
FIG. 1 is an isometric view of a standoff device with cable support in accordance with an embodiment of the present disclosure.
Figure 2:
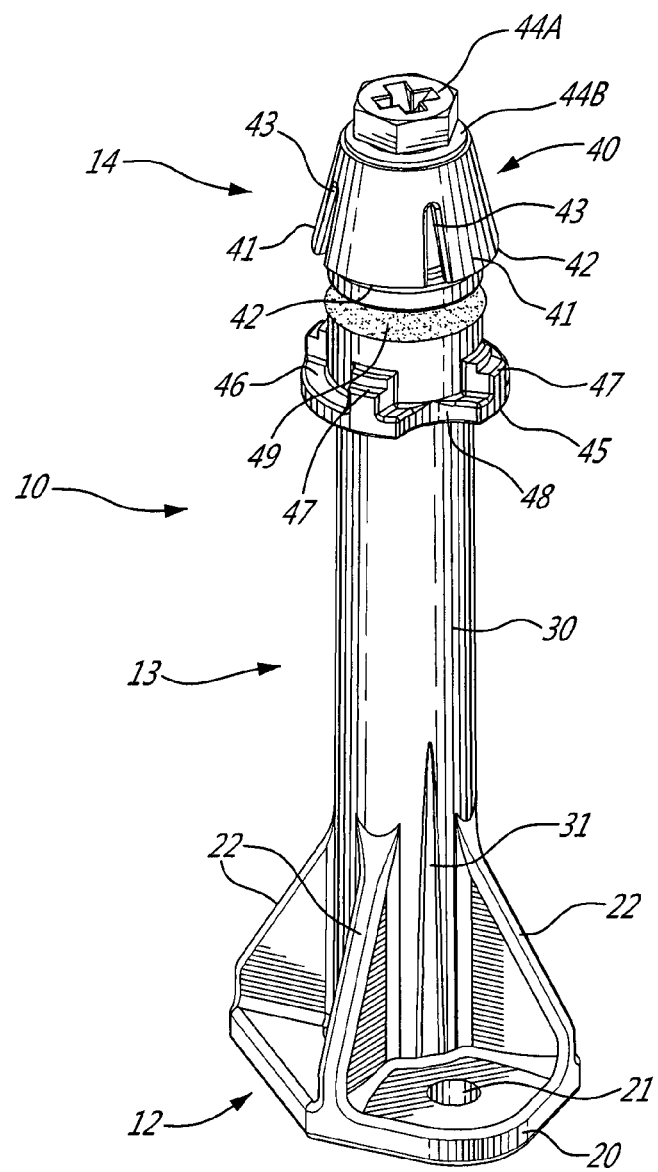
FIG. 2 is an isometric view of the standoff device of FIG. 1.
Figure 3:
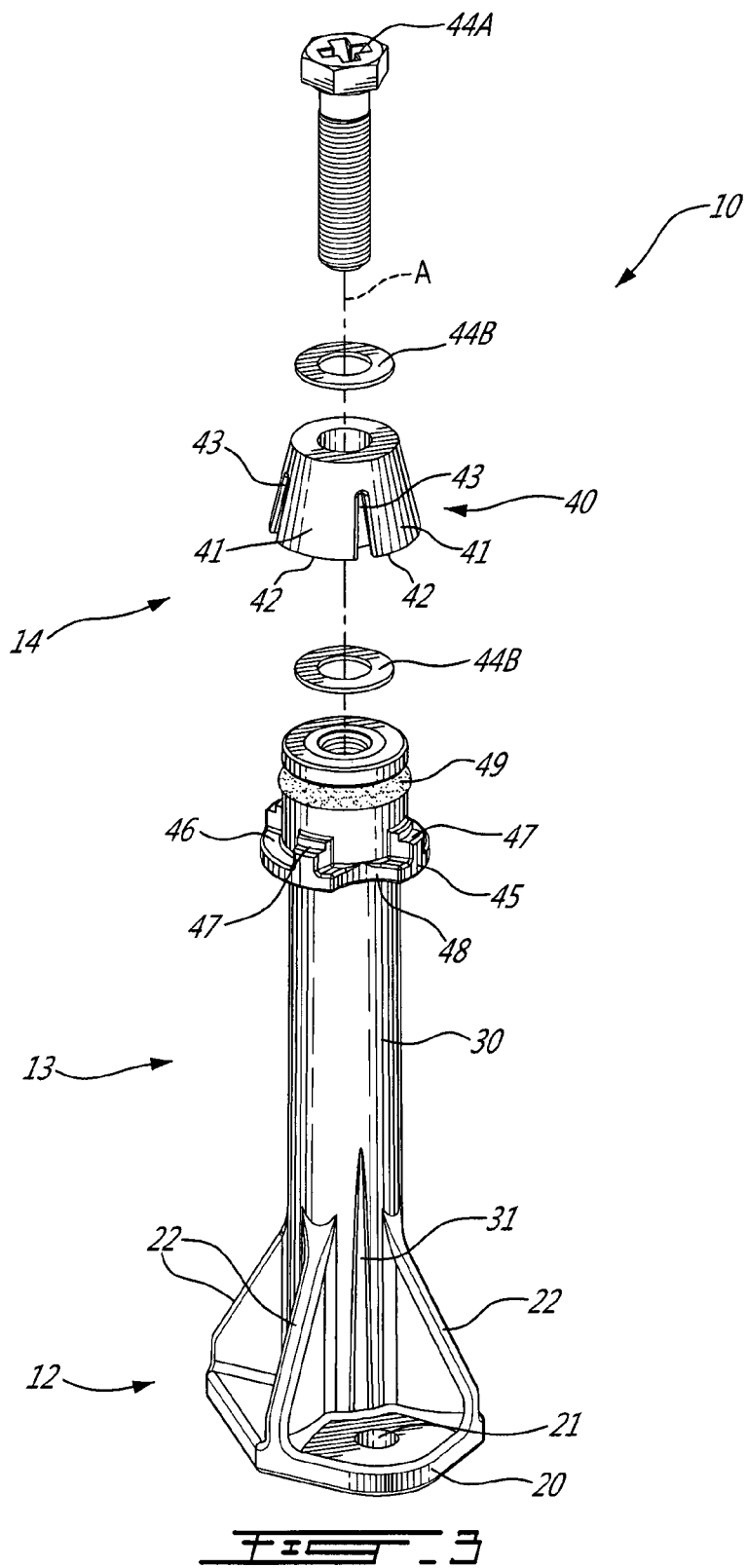
FIG. 3 is an assembly view of the standoff device of FIG. 1.

Referring to the drawings, and more particularly to FIGS. 1-3, a standoff device is generally shown at 10. The standoff device, occasionally referred to hereinafter as "device 10" for simplicity purposes, is also known as a standoff, harness connector, connection post, among other possible names. The standoff device 10 is used to connect a wire harness or wire harnesses to a structure, while physically spacing the wire harness or harnesses apart from the structure (i.e., standing off the wire harness from the structure).

The device 10 has a fixation portion 12, a spacing portion 13, and a connector portion 14. A cable support 15 is releasably secured to the connector portion 14 of the device 10.

The fixation portion 12 is the interface between the device 10 and a structure.

The spacing portion 13 projects from the fixation portion 12 and distances the connector portion 14 from the structure, whereby the wire harness is held at a stand-off distance from the structure.

The connector portion 14 is the interface of the device 10 with the cable support 15.

The cable support 15 is the interface between the wire harness or harnesses and the device 10, and is also referred to in the industry as clip or plastic clip. It is pointed out that other wire harness connector components or other cable-support configurations may be used as alternatives to the double cable support, such as a hat support, tie-down strip, or single cable support. However, for simplicity purposes, reference will be made to a cable support 15 in the next paragraphs, although other components can be used instead.

Referring to FIGS. 1-3, the fixation portion 12 is shown as having a base plate 20. The base plate 20 has a generally flat undersurface. In the illustrated embodiment of FIGS. 1-3, a longitudinal axis A of the device 10 is generally normal to the plane of the undersurface of the base plate 20. However, any other arrangement and angles are considered as well. Moreover, the undersurface of the base plate 20 may also be curved or may adopt any other appropriate geometries. The fixation portion 12 may also have other configurations as alternatives to a base plate.

Holes 21 are provided in the base plate 20, with one of the holes 21 seen in FIGS. 1 to 3. The holes 21 are used in conjunction with fasteners, as shown hereinafter, to secure the base plate 20 to the structure. The fasteners may be bolts, rivets, screws, etc. It is also considered to glue, weld, or braze the base plate 20 to the structure, provided the bond is of sufficient structural integrity.

Figure 4:
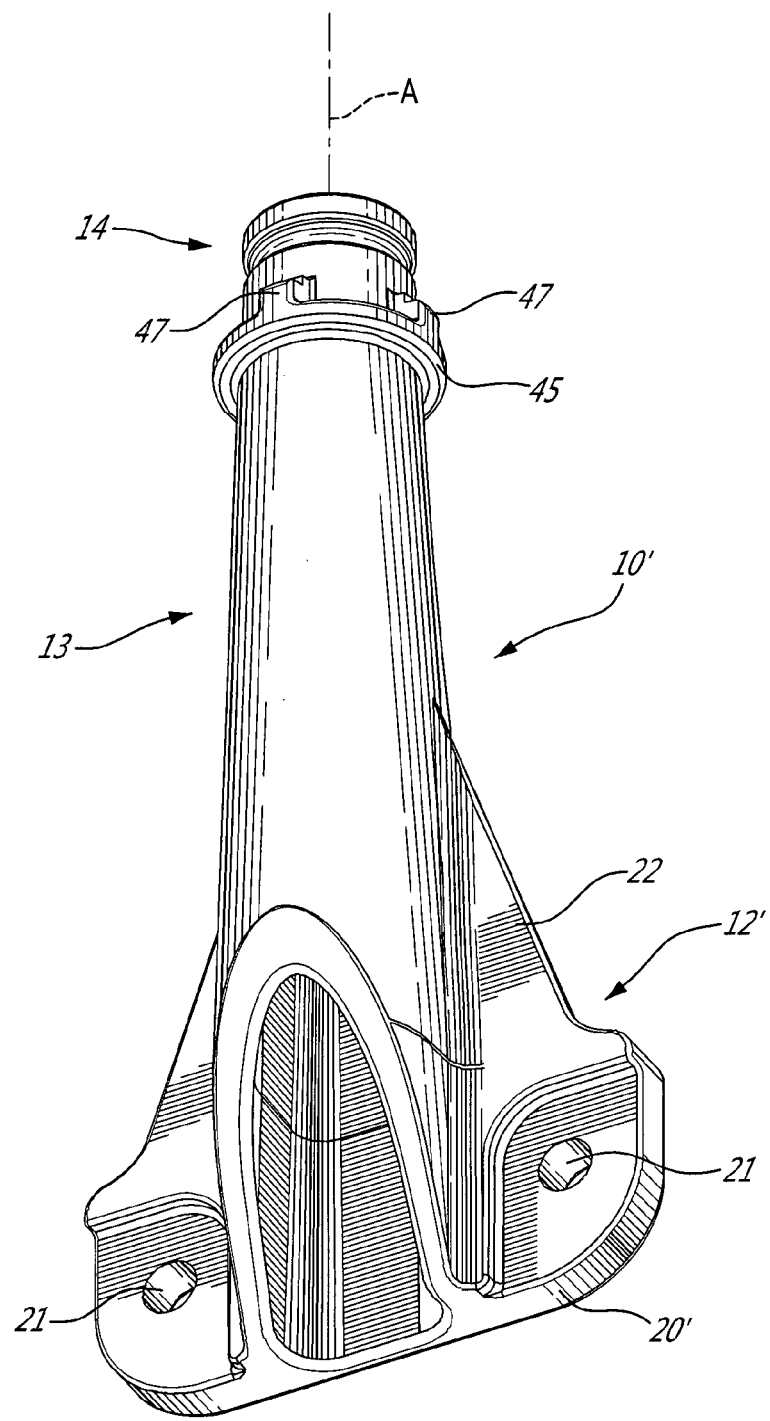
FIG. 4 is an isometric view of a component of the standoff device in accordance with an alternative embodiment of the present disclosure.

Referring to FIG. 4, an alternative embodiment of the base plate 20 is shown at 20', and is similar to that of FIGS. 1-3. However, the undersurface of the base plate 20' is generally parallel to the longitudinal axis A of the device 10. Accordingly, the base plate 20' is selected to fix the device 10 to a structure surface parallel to the longitudinal axis A of the device 10, while the base plate 20 is selected in the case of a structure surface in a normal relation with the longitudinal axis.

In FIGS. 1-4, reinforcement walls 22 project from the base plate 20/20' toward the spacing portion 13 and merge with post 30 of the spacing portion 13. The reinforcement walls 22 may be present to reinforce the junction between the base plate 20/20' and the post 30. Clearances 31 may be defined in the post 30 adjacent to the holes 21. The clearances 31 provide additional space for a tool, such as a screwdriver, used to fasten/loosen the fastener received in the holes 21.

In an embodiment, the fixation portion 12 and the spacing portion 13 are integrally formed in one piece, along with some components of the connector portion 14. The integrally-formed piece may be molded in polymeric materials, cast in metallic materials, etc. The selection of material depends on the characteristics required for the standoff device 10 Polymeric materials may be provided for their insulative properties and their low coefficients of thermal expansion. However, other materials may be used as a function of the requirements of wire harness connection.

Referring to FIGS. 1-3, the connector portion 14 is shown having a retaining clip 40, by which a cable support 15 may be releasably secured to the device 10. The retaining clip 40 has a generally frustoconical body or skirt, and is concentrically secured to a free end of the device 10. The retaining clip 40 is oriented such that the flared geometry is oriented toward the spacing portion 13. The flared end of the retaining clip 40 is constituted of resilient tabs 41, at the end of which are abutment edges 42. The resilient tabs 41 are separated by slits 43. The retaining clip 40 has at least a pair of the resilient tabs 41, but the embodiment of FIGS. 1-3 shows four of the resilient tabs 41. Due to the resilient nature of the tabs 41 and the presence of slits 43, a pressure applied on the outer surface of the retaining clip 40 will have the resilient tabs 41 move toward one another.

Accordingly, if a component is threaded onto it, the retaining clip 40 will deform so as to allow the component to pass thereover. Once the component is beyond the abutment edges 42, the retaining clip 40 returns to its flared shape (i.e., reforms), thereby opposing the abutment edges 42 against the component, thus preventing the component from moving axially over the retaining clip 40.

Any other appropriate configuration of clip may be used as an alternative to the frusto-conical skirt shape of FIGS. 2-3. For instance, it is considered to have a pair of resilient fingers projecting upwardly from the post, with wedge-shape abutments at ends thereof. Accordingly, retaining clip is intended to refer to a component allowing the latching of a cable support or like component to the device 10.

Still referring to FIGS. 1-3, the retaining clip 40 is secured to a free end of the post 30 by way of a fastener 44A. Washers 44B may also be used to reinforce the attachment of the retaining clip 40 to the post 30. In the event that the fastener 44A is used to secure the retaining clip 40 to the post 30, the post 30 is hollow and tapped. Other securing configurations are considered as well. As mentioned, a pair of fingers with wedge-shaped abutments may be used, in which case such fingers may be molded directly with the posts 30.

Still referring to FIGS. 1-3, the connector portion 13 has a flange 45. The flange 45 is located between the abutment edges 42 of the retaining clip 40 and the spacing portion 13. In the embodiment illustrated in FIGS. 1-3, the flange 45 is integrally formed with the post 30. The flange 45 has an abutment surface 46 facing toward the abutment edges 42 of the retaining clip 40. The annular space between the abutment surface 46 and the abutment edges 42 defines the location in which the cable support 15 will be held captive. Hence, the distance between such abutments is slight greater to the height of the cable support 15. The abutment surface 46 will prevent the axial displacement of the cable support 15 toward the structure to which the device 10 is connected, while the clip 40 prevents the cable support 15 from moving out of engagement with the device 10. Accordingly, by the presence of the abutment edges 42 and surface 46, the cable support 15 is prevented from axially moving along the device 10, once the engagement position of FIG. 1 is reached.

Indexation blocks 47 are formed on the flange 45 and project axially from the abutment surface 46. In the illustrated embodiment, the indexation blocks 47 are equidistantly spaced apart from one another. The indexation blocks 47 will cooperate with corresponding cavities in the cable support 15 to block the cable support 15 in rotation about the longitudinal axis A. However, the orientation of the cable support 15 may be selected when positioning the cable support 15 onto the device 10, as will be described in detail hereinafter. In the illustrated embodiment, the indexation blocks 47 each have a stair configuration.

Cut-outs 48 may also be present in the flange 45. The cut-outs 48 have an arcuate or semicircular shape, and are in register with the holes 21 in the base plate 20. Accordingly, an installation tool, such as a screwdriver, may be held substantially parallel to the longitudinal axis A of the device 10 when fastening the device 10 to a structure via the holes 21.

An absorber 49 may be located in the space between the abutment edges 42 and the abutment surface 46 or at other locations. The absorber 49 projects radially outwardly from the surface of the post 30. Accordingly, the absorber 49 may slightly deform when the cable support 15 is in the engagement position of FIG. 1 on the device 10, thereby absorbing a portion of vibrations between the device 10 and the cable support 15. In the illustrated embodiment, the absorber 49 is an O-ring, but may also be any other type of seal or like component. The material selected for the absorber 49, for instance an elastomeric material, must be capable of sustaining the conditions to which the device 10 will be exposed.

Figure 5A:
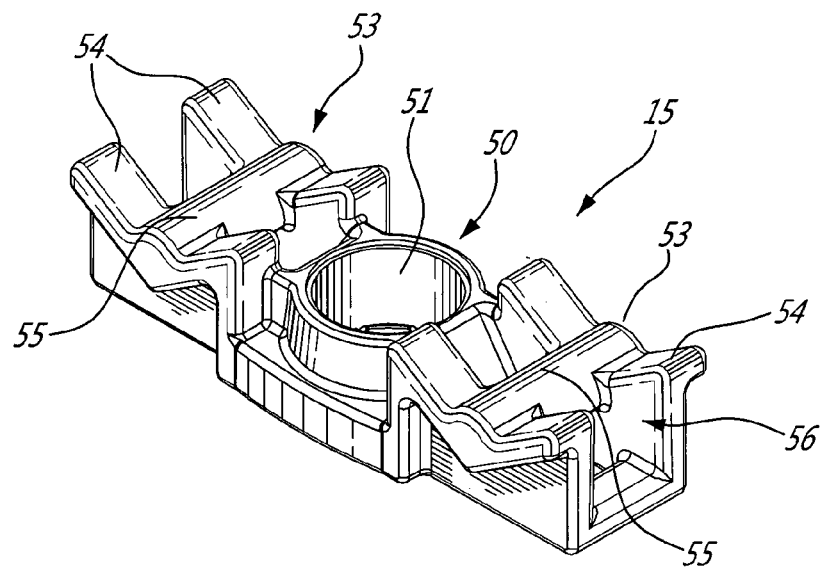
FIG. 5A is an isometric view of the cable support of FIG. 1, from an upper standpoint.
Figure 5B:
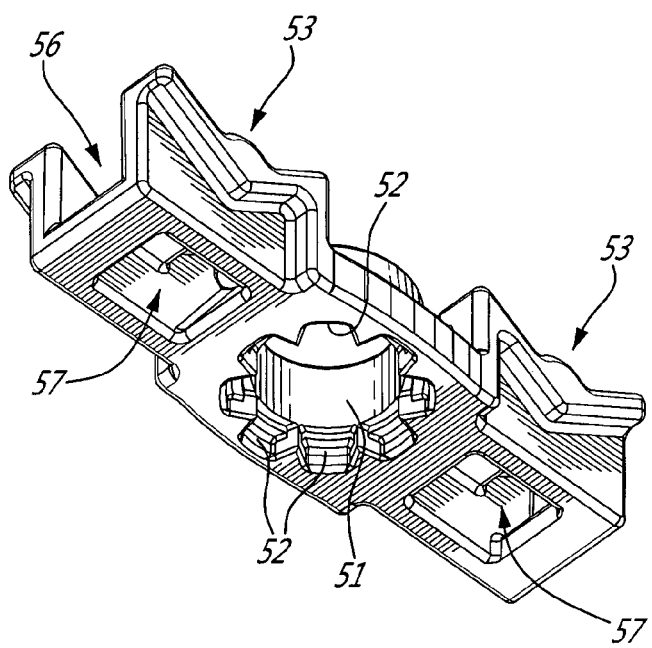
FIG. 5B is an isometric view of the cable support of FIG. 1, from a lower standpoint.

Referring to FIGS. 5A and 5B, the cable support 15 is shown in greater detail, as separated from the device 10. The cable support 15 is a double cable support 15, as it may be used with a pair of wire harnesses. The cable support 15 has a connector portion 50 that will collaborate with the connector portion 14 of the device 10 (FIG. 1) for the releasable interconnection between the device 10 and the cable support 15. Accordingly, the connector 50 features a through bore 51 having a diameter slightly greater than that of the connector portion 14 of the device 10 between the abutment edges 42 and the abutment surface 46. The through bore 51 may also slightly taper from top to bottom to facilitate the axial engagement of the cable support 15 onto the device 10 via the retaining clip 40.

In the underside of the connector portion 50, indexation cavities 52 are defined. The indexation cavities 52 are radially spaced apart and may be equidistant from one another. The indexation cavities 52 are sized so as to accommodate the indexation blocks 47 (FIGS. 2 and 3) of the connector portion 14. Accordingly, when the indexation blocks 47 are received in the indexation cavities 52, the cable support 15 is prevented from rotating about the longitudinal axis A of the device 10. Although eight of the indexation cavities 52 are illustrated, more or fewer of such indexation cavities 52 may be provided in the connector portion 50 of the cable support 15. It is pointed out that there must be some correspondence between the positioning and the spacing apart of the indexation blocks 47 of the connector portion 14 (FIGS. 2 and 3) and the indexation cavities 52 of FIG. 5B for their cooperative engagement.

The combination of indexation cavities and indexation blocks (i.e., the indexation formations) may be reversed, with the indexation cavities being present on the device 10 while the cable support 15 would have appropriate indexation blocks. Other arrangements of indexation formations are possible as well for the indexing of the cable support 15 relative to the device 10.

Cable interfaces 53 project laterally from the connector portion 50. The cable support 15 features a pair of the cable interfaces 53 (i.e., "double" cable support 15), but may also have a single one or numerous of such cable interfaces 53. For instance, in an embodiment, the cable support 15 is a quadruple cable support 15, in that it comprises the equivalent of the double cable support 15 of FIG. 5A in a set of two positioned back to back. In such a case, the device 10 must be sized so as to accommodate such a quadruple cable support.

Figure 6:
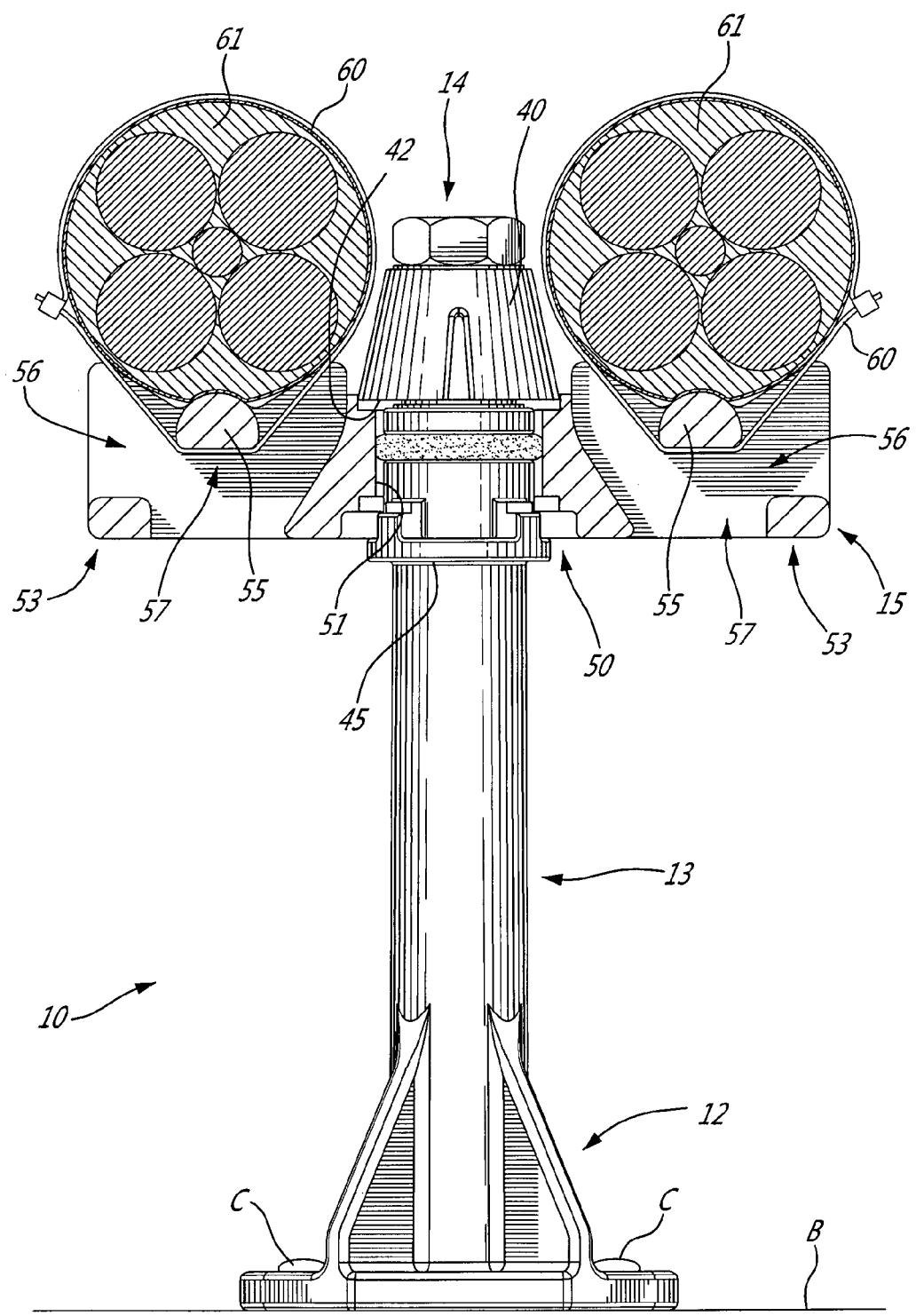
FIG. 6 is a partly sectioned view of the standoff device and cable support of FIG. 1, as used to connect wire harnesses to a structure.

Each of the cable interfaces 53 have support surfaces 54. The support surfaces 54 are arranged in a trough shape, upon which will be seated a wire harness (or bundle of wires, or single wires, tubes, etc). Other shapes are considered as well. A lug 55 is transversely positioned with respect to the support surfaces 54, with a passage 56 being defined thereunder. Therefore, a fastener strip, such as a tie wrap, cable or the like, may be passed into the passage 56, as shown in FIG. 6, whereby the wire harness 60 may be tied to the cable interface 53 and abutted against the support surfaces 54. An opening 57 may be provided to access the fastening strip, for instance, for cutting it off. Referring to FIG. 6, it is shown that tie wraps 60 is used to connect the wire harnesses 61 of the wire harness to the device 10. The device 10 is secured to a structure B by fasteners C. In an embodiment, the structure B is part of an aircraft, whereby the wire harnesses 61 are part of the aircraft.

Referring to FIG. 8, a single cable support 15 is shown at 80. The single cable support 80 is similar in construction to the double cable support 15 of FIGS. 5A and 5B, but features only one of the cable interfaces 53.

Referring to FIG. 9, other components of wire harnesses may be used, such as tie-down strips or hat support 90. The hat support 90 has a pair of through bores 91 at opposed ends, so as to be connected by a pair of the standoff devices 10 to a structure. A plurality of openings are provided in the support 90 so as to receive strips, cables, tie wraps or the like. Moreover, a channel 93 is also defined in the hat support 90, and is typically defined to enhance the interconnection between the hat support 90 and wire harnesses or the like strapped thereon.

Now that the standoff device 10 and the cable support 15 have been described, the installation of the cable support 15 onto the device 10 is now detailed with reference to FIG. 10, as methods 100. Prior to installation of the cable support 15 on the device 10, the device 10 is secured to the structure, and the wire harness/wire harnesses 61 may already be strapped onto the cable support 15 in the manner shown in FIG. 6. Alternatively, the cable support 15 may be connected to the device 10 prior to the strapping of the wire harnesses 61 thereon.

Referring concurrently to FIGS. 6 to 10, the cable support 15 is manually aligned with the device 10, such that the through bore 51 is generally concentric with the longitudinal axis A of the device 10. Moreover, the indexation cavities 52 are oriented toward the indexation blocks 47 of the device 10. As shown in 101, the connector portion 14 is then threaded through the through bore 51 of the cable support 15. By moving the cable support 15 along the longitudinal axis A, the retaining clip 40 slightly deforms when the cable support 15 passes over it.

Prior to the cable support 15 reaching the engagement position of FIG. 1, and thus prior to the engagement of the indexation blocks 47 into the indexation cavities 52, the cable support 15 may be rotated about the longitudinal axis A in accordance with 102, to adjust an orientation of the cable support 15 relative to the device 10. It is pointed out that the pressure applied by the resilient tabs 41 is sufficient to keep the cable support 15 blocked onto the retaining clip 40 while not preventing rotation of the cable support 15.

Once a desired orientation of the cable support 15 is reached, the cable support 15 is moved further along the longitudinal axis A, at which point the cable support 15 will be beyond the abutment edges 42 of the retaining clip 40 in accordance with 103, and thus in the engagement position of FIG. 1. When the cable support 15 is beyond the abutment edges 42, the retaining clip 40 regains its initial shape, thereby preventing axial displacement of the cable support 15 out of engagement with the device. In this engagement position, as illustrated in FIG. 1, the indexation blocks 47 are received in the indexation cavities 52. The cable support 15 will therefore be latched onto the device 10 (i.e., automatically blocked as a result of the translation engagement movement), as the cable support 15 is releasably secured to the device 10.

Figure 7:
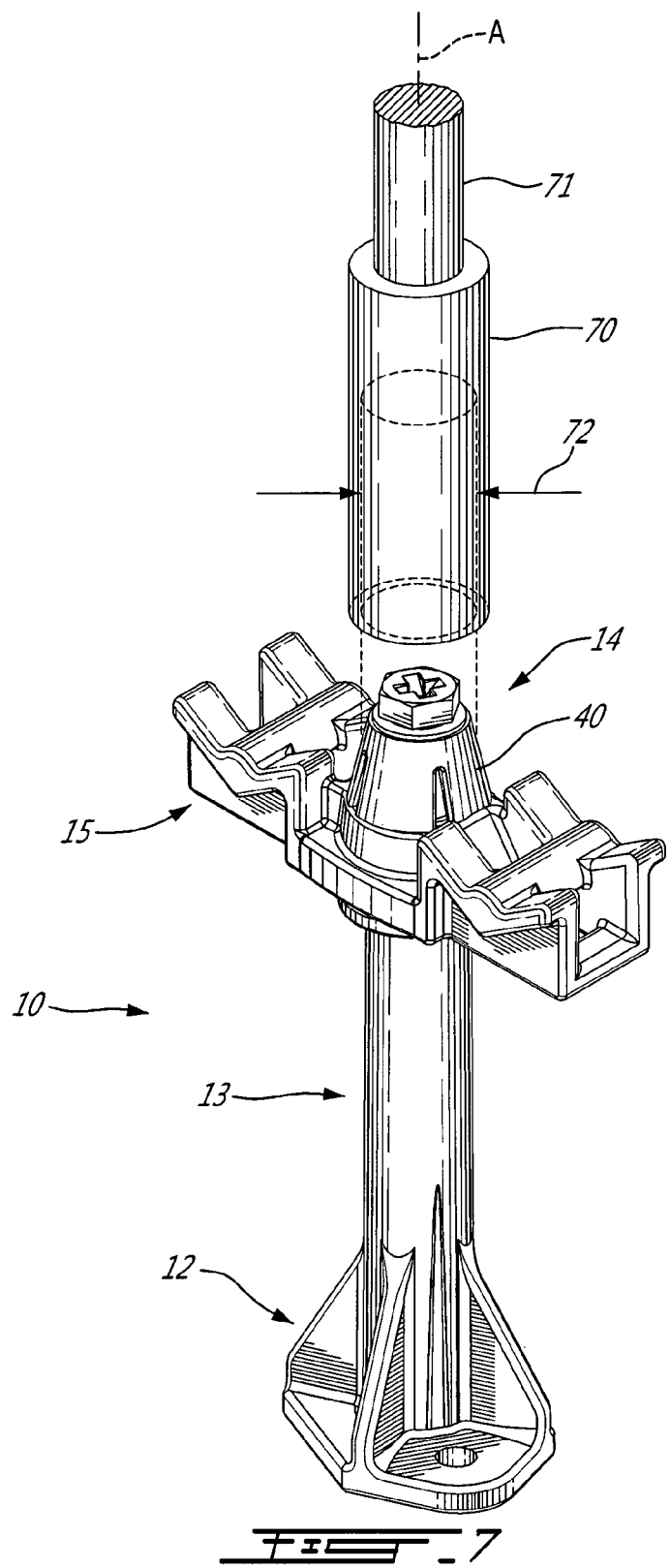
FIG. 7 is an isometric view of the standoff device and cable support of FIG. 1, with a removal tool.

In order to remove the cable support 15 from the device 10, a tool is used as illustrated in FIG. 7. The tool has a socket 70 at an end of a shaft 71. A handle may be provided at the opposed end of the shaft 71 to facilitate manoeuvring by an operator. The socket 70 is a cylindrical tube having an inner diameter 72 essentially similar to that of the through bore 51 of the cable support 15. The socket 70 is moved along longitudinal axis A of the device 10 until it engages with the retaining clip 40, in accordance with 104. As the socket 70 is moved along the longitudinal axis A, it will compress the retaining clip 40 in such a way that the resilient tabs 41 adopt concurrently a generally cylindrical shape. In doing so, the diameter of the retaining clip 40 is smaller than that of the through bore 51. Therefore, by applying an ejection pressure on the cable support 15 along longitudinal axis A in accordance with 105 (i.e., from the fixation portion 12 toward the connector portion 14), the cable support 15 will move out of engagement with the device 10, by passing over the retaining clip 40 in accordance with 106.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A device for connecting a wire harness to a structure, comprising:
a fixation portion adapted to be secured to the structure;
a spacing portion connected at a first end to the fixation portion;
a connector portion connected to a second end of the spacing portion and spaced apart from the fixation portion, the connector portion comprising a retaining clip adapted to resiliently deform when a wire harness connector component moves axially thereon toward the fixation portion and adapted to oppose at least one abutment edge against a first portion of the connector component into an engagement position when the connector component is past the retaining clip to prevent the connector component from moving back onto the retaining clip, and at least one abutment surface adapted to contact a second portion of the connector component in the engagement position to prevent further axial movement of the connector component toward the fixation portion, whereby the connector component is held captive between the at least one edge and the at least one abutment surface; and
indexation formations between the at least one abutment edge and the at least one abutment surface, the indexation formations adapted to be indexingly engaged with complementary indexation formations on the wire harness connector component, whereby the wire harness connector component is blocked in orientation relative to the device.

2. The device according to claim 1, further comprising an elastomeric absorber on the connector portion between the at least one abutment edge and the at least one abutment surface, the elastomeric absorber adapted to contact the wire harness connector component in the engagement position.

3. The device according to claim 1, wherein the indexation formations are indexation blocks each having a stair geometry.

4. The device according to claim 1, wherein the at least one abutment surface is part of a flange on the connector portion.

5. The device according to claim 4, further comprising at least one cut-out in the flange, the at least one cut-out being in alignment with a respective fastener of the fixation portion.

6. The device according to claim 1, wherein the fixation portion has a base plate having an undersurface adapted to be laid onto the structure when the device is secured to the structure.

7. The device according to claim 1, wherein the retaining clip has a skirt geometry, with a flared portion of the retaining clip oriented toward the fixation portion.

8. The device according to claim 7, wherein the flared portion comprises at least two resilient tabs, with each of the resilient tabs comprising one of the abutment edges.

9. The device according to claim 6, wherein the spacing portion has an elongated body between the fixation portion and the connector portion.

10. The device according to claim 9, wherein the elongated body of the spacing portion has one of a longitudinal axis normal to the undersurface of the base plate and a longitudinal axis parallel to the undersurface of the base plate.

11. A system for connecting a wire harness to a structure, comprising:
- a wire harness connector component comprising:
  - a through bore;
  - a first cable interface that is laterally offset in relation to the through bore; and
  - a second cable interface that is laterally offset in relation to the through bore; and
- a standoff device, comprising:
  - a fixation portion adapted to be secured to the structure; and
  - a spacing portion connected at a first end to the fixation portion; and
  - a connector portion connected to a second end of the spacing portion and spaced apart from the fixation portion, the connector portion comprising:
  - a retaining clip adapted to resiliently deform when the wire harness connector component moves axially thereon toward the fixation portion and adapted to oppose at least one abutment edge against a first portion of the connector component into an engagement position when the connector component is past the retaining clip to prevent the connector component from moving back onto the retaining clip; and
  - at least one abutment surface adapted to contact a second portion of the connector component in the engagement position to prevent further axial movement of the connector component toward the fixation portion, whereby the connector component is held captive between the at least one edge and the at least one abutment surface.

12. The system according to claim 11, wherein the first and second cable interfaces are disposed at laterally opposing positions with respect to the through bore and define a double cable support.

13. The system according to claim 11, wherein the first and second cable interfaces each comprise:
- a support surface with a trough shape; and
- a lug transversely positioned with respect to the support surface, the lug defining a passage thereunder.

14. The system according to claim 13, further comprising:
- an opening in the cable interface, beneath the lug, providing access to a fastener from a position beneath the cable interface.

* * * * *